United States Patent
T. G

(10) Patent No.: US 10,917,520 B1
(45) Date of Patent: Feb. 9, 2021

(54) AUTOMATED SELF-SERVICE CALLBACK FOR PROACTIVE AND DYNAMIC USER ASSISTANCE

(71) Applicant: INTUIT INC., Mountain View, CA (US)

(72) Inventor: Vishnu Priya T. G, Bangalore (IN)

(73) Assignee: INTUIT INC., Mountain View, CA (US)

( * ) Notice: Subject to any disclaimer, the term of this patent is extended or adjusted under 35 U.S.C. 154(b) by 113 days.

(21) Appl. No.: 16/458,524

(22) Filed: Jul. 1, 2019

(51) Int. Cl.
H04M 3/436 (2006.01)
G06F 8/61 (2018.01)
H04M 3/523 (2006.01)
H04M 3/42 (2006.01)

(52) U.S. Cl.
CPC .......... H04M 3/4365 (2013.01); G06F 8/61 (2013.01); H04M 3/42195 (2013.01); H04M 3/5233 (2013.01)

(58) Field of Classification Search
CPC .......... H04M 3/4365; H04M 3/42195; H04M 3/5233; G06F 8/61
See application file for complete search history.

(56) References Cited

U.S. PATENT DOCUMENTS

| | | | |
|---|---|---|---|
| 9,654,641 B1 * | 5/2017 | Chishti | H04M 3/5233 |
| 10,802,872 B2 * | 10/2020 | Gopalan | H04L 67/327 |
| 10,867,298 B1 * | 12/2020 | Duke | G06Q 20/382 |
| 2003/0208685 A1 * | 11/2003 | Abdel-Rahman | G06F 21/629 |
| | | | 713/191 |
| 2008/0107256 A1 * | 5/2008 | Jaiswal | H04M 3/5125 |
| | | | 379/265.12 |
| 2010/0226490 A1 * | 9/2010 | Schultz | H04M 3/523 |
| | | | 379/265.09 |
| 2011/0313931 A1 * | 12/2011 | Bronstein | G06Q 30/06 |
| | | | 705/80 |
| 2014/0164317 A1 * | 6/2014 | Lynch | G06Q 10/10 |
| | | | 707/609 |
| 2016/0196131 A1 * | 7/2016 | Searle | H04L 29/06 |
| | | | 717/173 |

(Continued)

FOREIGN PATENT DOCUMENTS

| | | | | |
|---|---|---|---|---|
| CN | 104267972 A | * | 1/2015 | |
| EP | 1492008 A2 | * | 12/2004 | G06F 11/366 |

(Continued)

Primary Examiner — Charles T Shedrick
(74) Attorney, Agent, or Firm — Patterson + Sheridan, LLP

(57) ABSTRACT

Certain aspects of the present disclosure provide techniques for providing an automated callback service to a user. An example technique includes receiving an indication of a product installation failure, which includes an error code, a context of the computing device, and a product identifier. Based on the product identifier, a phone number is retrieved that is associated with the user of the computing device. A set of solutions predicted to resolve the installation failure is retrieved, based on the error code and the context. A callback is established to the user, and the user is connected with a virtual agent that will provide solutions from the set of solutions in the ranking order retrieved until a solution is determined to resolve the product installation error. The ranking of the predicted solutions is updated for other users in the future who may face a similar product installation error.

20 Claims, 8 Drawing Sheets

(56) References Cited

U.S. PATENT DOCUMENTS

2016/0364732 A1* 12/2016 Jagatheesan ......... G06Q 30/016
2016/0373944 A1* 12/2016 Jain ....................... H04W 24/02
2019/0347282 A1* 11/2019 Cai ...................... G06K 9/6231
2020/0192686 A1*  6/2020 Dwivedi ............ G06Q 30/0281
2020/0349133 A1* 11/2020 Dwarampudi ...... G06F 16/1734

FOREIGN PATENT DOCUMENTS

| GB | 2405552 A * | 3/2005 | .......... H04M 3/5233 |
|----|---|---|---|
| KR | 101016649 B1 * | 2/2011 | |
| KR | 20160064751 A * | 6/2016 | |
| WO | WO-0154388 A1 * | 7/2001 | .......... H04M 3/5191 |
| WO | WO-2013042116 A1 * | 3/2013 | ............. G10L 13/08 |

* cited by examiner

US 10,917,520 B1

AUTOMATED SELF-SERVICE CALLBACK FOR PROACTIVE AND DYNAMIC USER ASSISTANCE

INTRODUCTION

Aspects of the present disclosure relate to a method and system for establishing an automated callback between a user and a virtual agent in order to assist the user.

BACKGROUND

Customer (or user) support is a vital aspect of providing a quality product and/or service to a user. An organization may not only provide a wide range of products and/or services to a user but also provide support for the same. Historically, support provided by the organization generally consists of providing telephone-based, email, postal mail, or even in-person support options.

However, in conventional systems, a user seeking support may not be able to receive specialized support outside the organization's business hours. For example, if a user is installing a software program product on Saturday at 9 P.M. and the installation fails to complete properly, then the user can try calling customer support for assistance from a support agent. Based on the day and time in the example, however, no support agents may be available to assist the user. Further, even if the user is able to get in touch with a support agent, the user would have to report the issue and answer questions related to the context of the product installation error, which in turn delays the user from getting specialized support from the support agent. Additionally, the support agent may not have the background or experience to be able to adequately assist the user and may transfer the user to another support agent.

In another example, if the user sends an email requesting assistance from a support agent of the organization, the user may not receive a response from a support agent for at least one day. Further, the process of receiving assistance from the support agent may take even longer as the user and support agent correspond via email at their convenience.

Therefore, a solution is needed to provide assistance to a user facing an issue with a product or service, without the delay and inefficiencies associated with conventional solutions in providing assistance to users.

BRIEF SUMMARY

Certain embodiments provide a method for an automated callback service. The method generally includes receiving, at a first time from a first REST endpoint invoked by a first computing device upon a product installation failure of a product at the first computing device: an error code indicative of a type of product installation failure, a context of the first computing device, and a product identifier associated with the product at the first computing device. The method further includes retrieving a phone number associated with the product identifier and a user of the first computing device. The method further includes retrieving a set of predicted solutions from a solution database associated with the error code and the context of the first computing device, wherein each predicted solution is associated with a ranking in a ranking order of the set of predicted solutions. The method further includes establishing, based on the retrieved phone number, a callback to the user via a contact flow service. The method further includes providing, to the user via a virtual agent, a predicted solution with a highest ranking in the ranking order of the set of predicted solutions. The method further includes determining, via the virtual agent, the predicted solution with the highest ranking in the ranking order resolves the product installation failure on the first computing device. The method further includes updating the ranking order of the set of predicted solutions based on the predicted solution with the highest ranking resolving the product installation failure.

Other embodiments provide systems configured to perform the aforementioned method for an automated callback service, as well as non-transitory computer-readable storage mediums comprising instructions that, when executed by a processor of a processing system, cause the processing system to perform methods for an automated callback service.

The following description and related drawings set forth detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
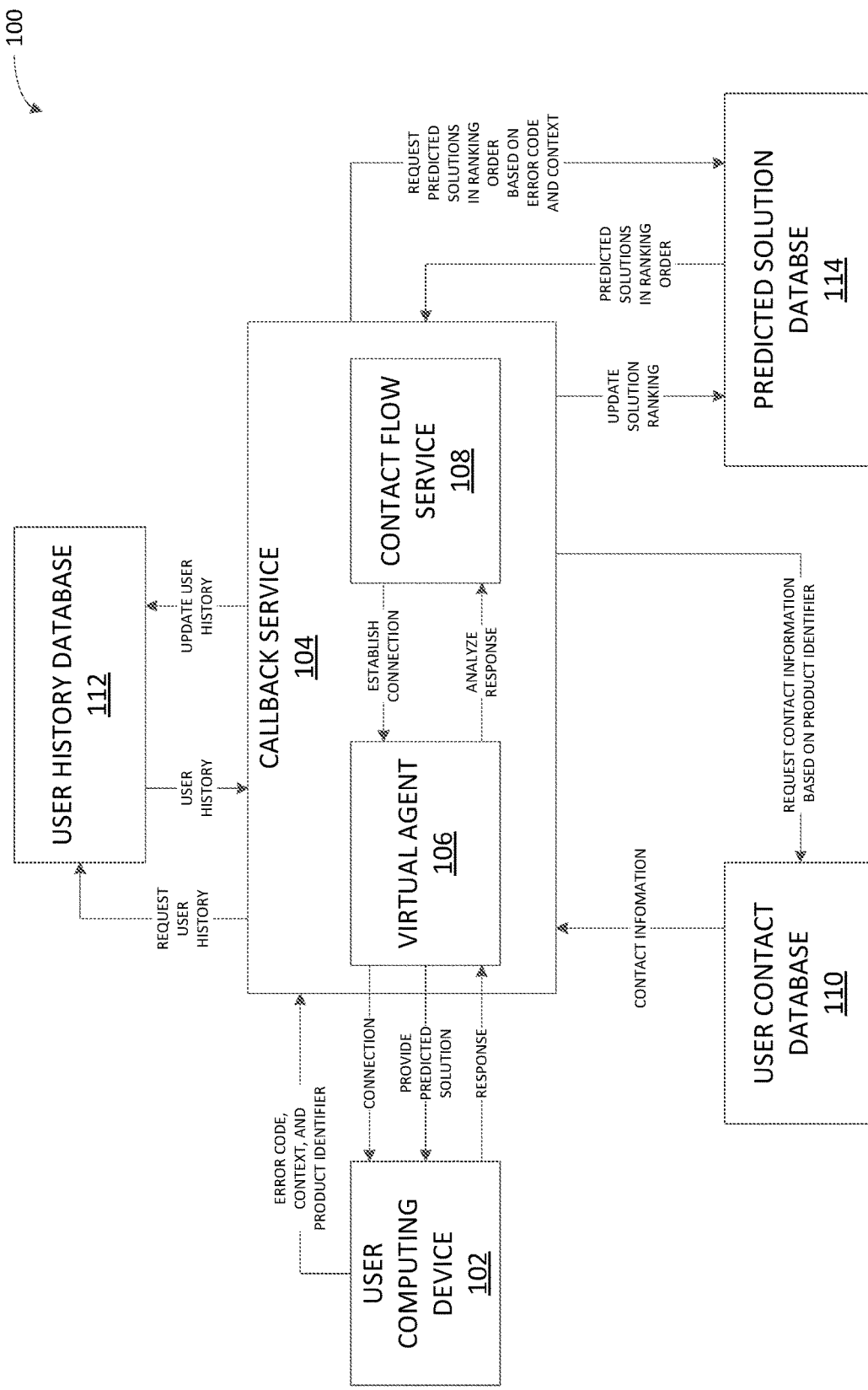
FIG. 1 depicts an example computing environment for establishing an automated callback via the callback service.

Aspects of the present disclosure provide apparatuses, methods, processing systems, and computer readable mediums for providing an automated callback via an automated callback service that connects a user to a virtual agent when the user has an issue with a product. The virtual agent interacts with the user and provides the user a solution predicted to resolve the issue the user is facing with the product.

In one embodiment, a user attempting to use a product (or service) receives an error (e.g., an error message) preventing the user from utilizing the product. In some cases, a user may be trying to install a software program product on a computing device but is not able to properly install or launch the software program due to an installation error. In other cases, a user may be trying to use a feature of the software program product on the computing device but is not able to access the feature on the computing device or the feature may not initiate as intended.

To assist the user, an automated callback service can initiate an automated callback to the user, connecting the user with a virtual agent. The automated callback service receives the error message and uses information from the error message to determine a set of predicted solutions and to contact the user. The error message can include an error code indicating the type of error, a context of the user computing device where the error occurred (e.g., the type of computing device, a timestamp, and at what point in the operational flow of the installation and/or use of the product the error occurs), a product identifier (e.g., a product license number), and the like. For example, when a software program product fails to install on a computing device of the user, the automated callback service receives an error message including an error code indicative of the type of product installation failure, the type of computing device (e.g., a tablet, laptop, smartphone, desktop), the operating system of the computing device, a timestamp of when the error occurred, and a product license associated with the software program product. The automated callback service, using the product license, can identify the user's phone number by retrieving the user's contact information associated with the product license. Additionally, based on the type of product installation failure and the context of the computing device, the automated callback service retrieves a set of predicted solutions to resolve the error. The set of predicted solutions are ranked from highest to lowest predicted solutions for resolving the error.

Once the automated callback service retrieves the set of predicted solutions, the automated callback is established between the user and a virtual agent using a contact flow service. For example, the contact flow service establishes a phone call to the user's phone number, connecting the user to a virtual agent.

The virtual agent interacts with the user to resolve the error by providing the first (highest ranked) predicted solution. The user provides a response to the virtual agent indicating whether the first predicted solution resolves the error. If the automated callback service determines based on the user response that the first predicted solution does not resolve the error, then the virtual agent provides the second predicted solution. In some cases, the interaction between the user and the virtual agent continues until the user responds a predicted solution resolves the error or there are no more predicted solutions available.

After receiving a response from the user that a predicted solution resolves the error, the ranking order of the set of predicted solutions is updated so that when another user calls facing the same error, the automated callback service can provide the predicted solution that worked for the previous user. For example, if a first user responds that a second ranked predicted solution resolves the error, then the ranking of the second ranked predicted solution is increased to the highest (first) ranking. In such cases, when a second user calls facing the same error as the first user, then the second user will be first provided the predicted solution that worked for the first user.

In some cases, none of the predicted solutions provided by the virtual agent resolve the error. In such cases, the call between the user and the virtual agent is disconnected, and the automated callback service can connect the user to a live support agent for further assistance to resolve the error.

Example Computing Environment for Establishing an Automated Callback

FIG. 1 depicts an example computing environment 100 for establishing an automated callback between a user and a virtual agent. The example computing environment 100 includes a user computing device 102, a callback service 104, a user contact database 110, a user history database 112, and a predicted solution database 114.

The callback service 104 can receive a notification from a user computing device 102 indicating an error associated with the user computing device 102. In some cases, the callback service 104 can receive an error message associated with the installation and/or use of a software program product on the user computing device 102. As depicted, the callback service 104 receives an error code, context, and product identifier from the user computing device 102. For example, the callback service 104 can receive the error code, context, and product identifier when the user computing device 102 invokes a REST endpoint upon a failure to successfully install a software program product on the user computing device 102. In other cases, prior to receiving an error indication, the callback service 104 can receive an authorization from a user associated with the user computing device 102. For example, the callback service 104 cannot contact the user in cases of a product installation and/or use error unless the user has provided authorization to the callback service 104 to do so.

The error code can include a pre-defined code identifying the type of error associated with installation and/or use of the software program product on the user computing device 102. The context can include the type of user computing device 102, operating system of the user computing device 102, product version for installation and/or use on the user computing device 102, page or field within the product that the error occurred, a timestamp associated with the error code, and the like that indicates the setting in which the error occurs on the user computing device 102. The product identifier indicates the particular product licensed, registered, and/or owned by the user and associated with the error on the user computing device 102.

As depicted, the callback service 104 requests contact information from a user contact database 110 based on the product identifier received from the user computing device 102. The user contact database 110 can store user contact information including mailing address, email address, and telephone number of the user associated with the user computing device 102. The contact information stored in the user contact database 110 is associated with a product identifier registered to the user. The callback service 104 can retrieve user contact information associated with the product identifier matching the product identifier received from the user computing device 102. In some cases, the callback service 104 can retrieve user contact information based on other identifying information received from the user computing device 102 that matches user information associated with the user contact information stored in the user contact database, including user name and user identification.

In some cases, the callback service 104 retrieves user history from a user history database 112. The user history assists the callback service 104 by providing additional details about the user associated with the error on the user computing device 102. The callback service 104 can use the additional details about the user to resolve the error on the user computing device 102. In some cases, a user history can include records of previous successful and failed attempts to install and/or use the same or different software program products by the user. For example, the user history can include a record of a previous failed attempt to install a software program product on the user computing device 102, the context in which the error occurred, error status indicating the error is resolved, and the solution for resolving the error. In another example, the user history can include a record of a previous successful installation of a prior version of the software program product on the user computing device 102. In some cases, the user history can include records associated with the user for other computing devices. For example, if the user uses a software program product on a laptop and a tablet computing devices, then the user history of the user can include records of both computing devices for the callback service to retrieve when determining a solution for the user.

The callback service 104 retrieves a set of predicted solutions to resolve the error associated with the user computing device 102 based on the error code and context from the user computing device 102. The callback service 104 retrieves the set of predicted solutions for the specific error code and context from a predicted solution database 114 that comprises a set of predicted solutions for each type of error code and context. A predicted solution stored in the predicted solution database 114 can include a knowledge-based article and a solution generated by another user to resolve an error associated with user computing devices. Each predicted solution in the set of predicted solutions is stored according to a ranking as to which predicted solution is more likely to resolve the error. The ranking of the predicted solutions is based on previous instances of the callback service 104 resolving an error associated with other user computing devices with the same error code and context.

In some cases, the set of predicted solutions can also be ranked and retrieved from the predicted solution database 114 according to user history. In such cases, the callback service 104 can determine a pattern in the user history, and based on the pattern, the callback service 104 can retrieve a set of predicted solutions for the user. For example, the predicted solution database 114 can store a ranked set of predicted solutions that have been previously provided to users that have multiple failed attempts of installing the same software program product. In another example, the predicted solution database 114 can store a different ranked set of predicted solutions for users that have a first instance failed attempt of installing the same software program. Based on the user history retrieved from the user history database, the callback service 104 can retrieve the set of predicted solutions that matches the user history as well as the error code and context of the user computing device 102.

With the set of predicted solutions retrieved from the predicted solution database 114, the callback service 104 establishes a connection between the virtual agent 106 and the user via the contact flow service 108. The virtual agent 106 is a non-human support agent that is trained to interact with users based on recordings of previous interactions between users and human support agents. Further, the virtual agent 106 is continuously trained based on on-going interactions between users and the virtual agent 106. In some cases, the contact flow service 108 establishes a connection to the user via the same user computing device 102 in which the error occurs. For example, if the user fails to install a software program product on a tablet computer, the contact flow service 108 can establish an audio call to the user via the tablet computer. In other cases, the contact flow service 108 establishes a connection with the user via a different device. For example, if the user fails to install software program product on a laptop, the contact flow service 108 can establish a connection to the user's phone (e.g., via a landline phone number or a cellular device phone number) provided in the contact information and retrieved based on the product identifier provided with the error code and context.

Once the connection is established between the virtual agent 106 and the user, the virtual agent 106 provides the highest ranked predicted solution to the user to resolve the error. The user provides a response to the virtual agent 106 that is analyzed within the contact flow service 108 (e.g., via natural language processing) to determine whether the predicted solution provided by virtual agent 106 resolves the error. If the predicted solution resolves the error then the connection between the user and the virtual agent 106 is disconnected. In some cases, prior to disconnecting the connection, the automated callback service can receive feedback from the user via the virtual agent about the automated callback interaction.

If the predicted solution does not resolve the error, then the virtual agent 106 provides the next highest ranked solution to the user. The interaction between the user and the virtual agent 106 continues until either the user response indicates the predicted solution resolves the error or there are no more predicted solutions for the virtual agent to provide to the user.

Once the interaction between the user and the virtual agent 106 ends, the ranking of the set of predicted solutions is updated. For example, if the second ranking predicted solution resolved the error, then the ranking is adjusted so that second ranking predicted solution is stored as the first ranking predicted solution and when the callback service 104 receives the same error (e.g., same error code and context) from a different user computing device, the user associated with the different user computing device can first receive the predicted solution that worked previously for the same error.

Example Contact Flow

Figure 2:
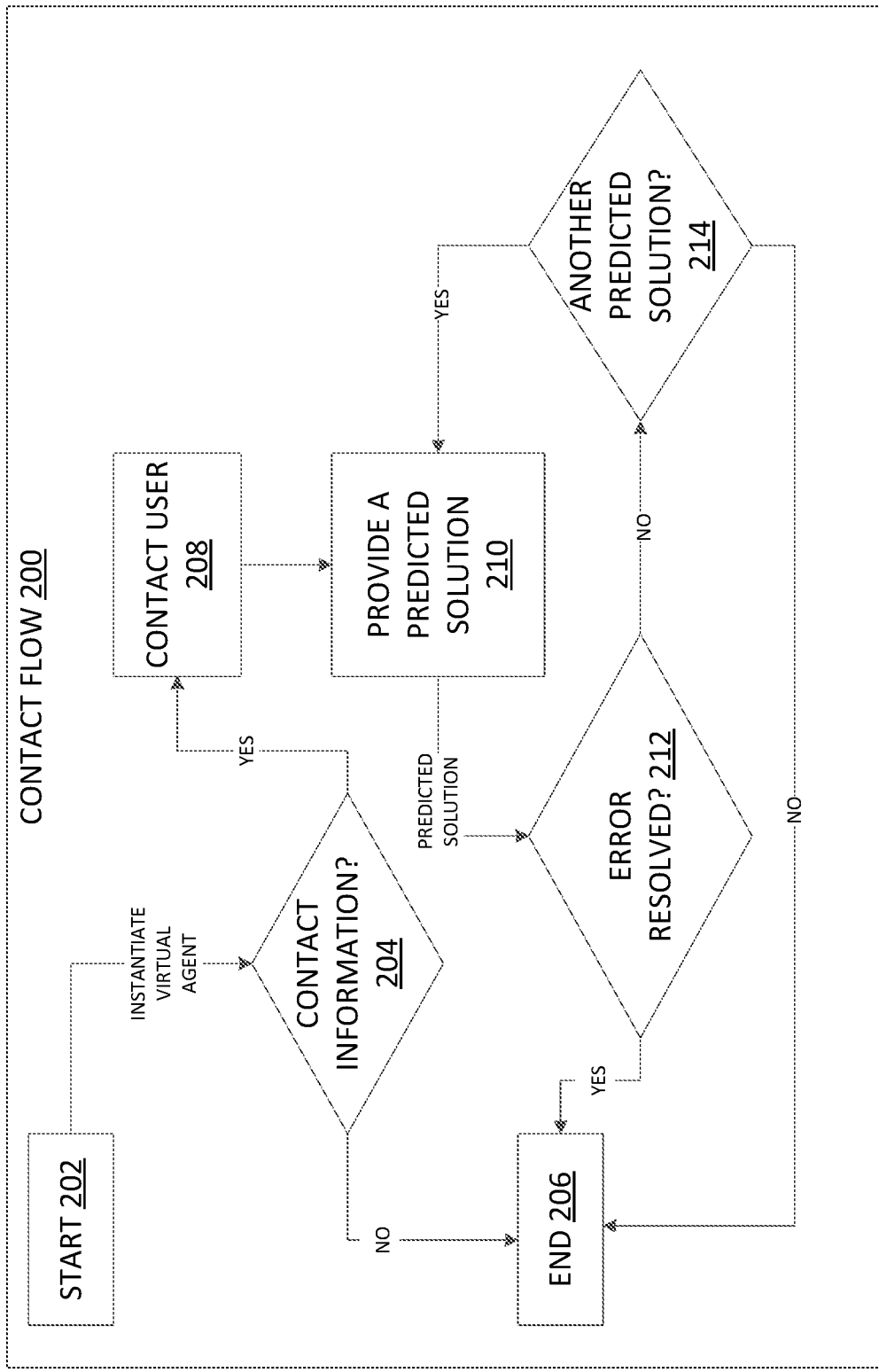
FIG. 2 depicts an example contact flow established for the automated callback service to interact with the user via the virtual agent.

FIG. 2 depicts an example contact flow 200 established to connect a user and a virtual agent. The contact flow 200 is established by a contact flow service and starts at 202. In some cases, the contact flow 200 starts at 202 when the callback service retrieves a set of predicted solutions from the predicted solution database. When the contact flow 200 starts at 202 the contact flow service instantiates the virtual agent in the contact flow 200.

Once the virtual agent is instantiated, the contact flow 200 continues and the contact flow service determines whether contact information of the user is available at 204. If there is no contact information of the user available, then contact flow 200 ends at 206. In some cases, the callback service fails to retrieve contact information because no contact information is available in the contact database or the callback service does not have authorization to access some or all of a user's contact information. If the contact flow service determines at 204 there is available contact information the contact flow service is authorized to use, the contact flow 202 continues as the contact flow service contacts the user at 208 to connect the user and the virtual agent (e.g., by audio call or video call). In some cases, the contact flow service establishes a call to the same user computing device that the callback service received an error from. In other cases, the contact flow service establishes a call to another device associated with the user, including a landline telephone.

After the virtual agent and the user are connected, the contact flow 200 continues and provides at 210 a predicted solution. The contact flow service, having retrieved a set of predicted solutions in ranking order, provides via the virtual agent in the contact flow 200 a predicted solution to the user. The virtual agent receives a response back from the user that the contact flow service analyzes using a natural language processing service to determine in the contact flow at 212 whether the predicted solution resolves the error for the user. If the predicted solution resolves the error, the contact flow 200 ends at 206. If the predicted solution does not resolve the error, the contact flow 200 continues, and the contact flow service determines at 214 whether there is another predicted solution available from the set of predicted solutions retrieved. If there is another predicted solution, the contact flow 200 returns to 210 to provide another predicted solution. The contact flow 200 continues to determine whether a predicted error is resolved at 212 and determine whether there is another predicted solution available at 214 until either the error is resolved or there are no more predicted solutions to provide to the user. If there are no more predicted solutions to provide to the user, the contact flow 200 ends at 206.

Figure 3A:
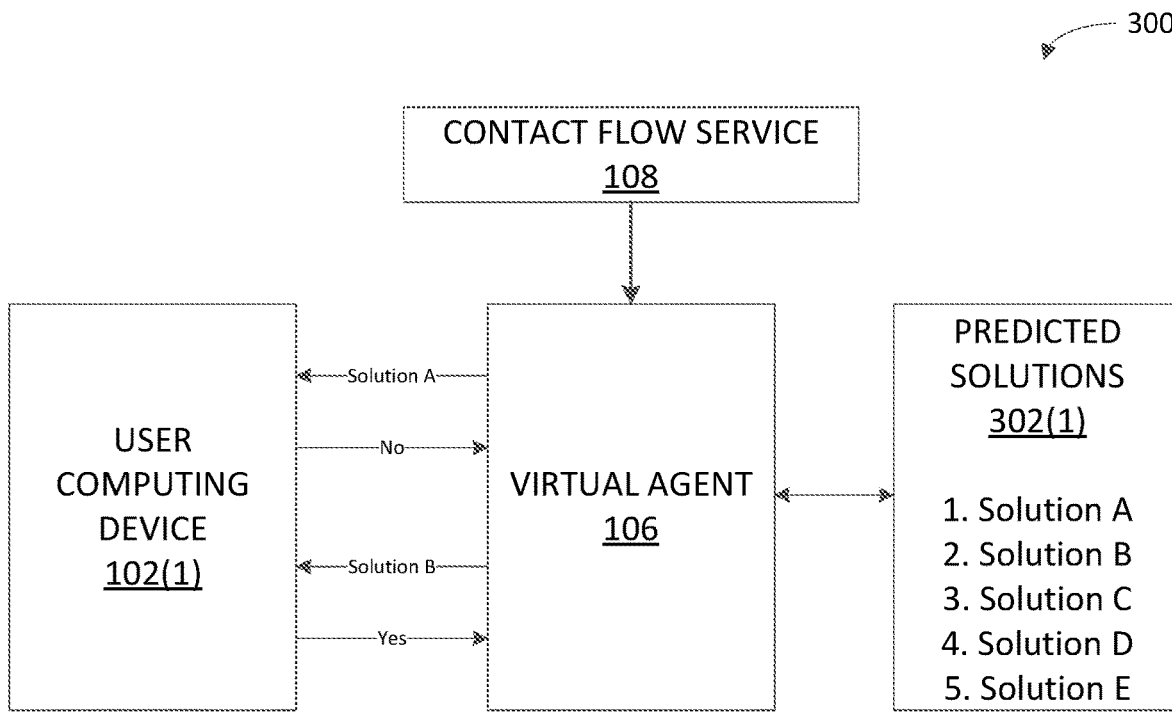
FIG. 3A depicts an example interaction between a virtual agent and a first user at a first time with a set of solutions predicted to resolve the first user's issue.

Example Interaction Between a Virtual Agent and User With a Set of Predicted Solutions FIG. 3A depicts an example interaction 300 between a virtual agent 106 and a first user at a first time. In the example interaction 300, the contact flow service 108 instantiates the virtual agent 106 to interact with the first user via the user computing device 102(1). In some cases, the first user computing device 102(1) is the same device that the error occurs on. In other cases, the first user computing device 102(1) is a different computing device that is associated with the user. The contact flow service 108 establishes a call to the first user via the user computing device 102(1). In some cases, the call may include an audio call or a video call.

Once the contact flow service 108 establishes a call between the first user and the virtual agent 106, the virtual agents 106 provides the first user a predicted solution (e.g., Solution A) from a set of predicted solutions 302(1). The set of predicted solutions 302(1) can include knowledge-based articles and a set of solutions generated by another user to resolve an error. Each predicted solution is in a ranking order, where the first predicted solution is the predicted solution most likely to resolve the error associated with the first user's computing device based on at least the error code and context.

After providing Solution A to the first user, the virtual agent 106 receives a response from the first user. As depicted, the first user's response "No" indicates Solution A did not resolve the error. The response provided to the virtual agent 106 is analyzed by the contact flow service 108. For example, the contact flow service 108 can use natural language processing to determine Solution A did not resolve the error. Upon determining the first predicted solution did not resolve the error, the virtual agent 106 provides the next ranked predicted solution to the first user. As depicted, the virtual agent 106 retrieves Solution B from the set of predicted solutions 302(1) and provides Solution B to the first user. The user provides a response "Yes" indicating Solution B resolves the error.

Upon receiving an indication Solution B resolves the error, the ranking of the set of predicted solutions 302(1) for resolving the error is updated in the predicted solution database so when a second user has the same error as the first user at a second time (following the first time), the second user will receive Solution B first. This example is further described in FIG. 3B.

While the example above describes the virtual agent 106 communicating with the user via the first user computing device 102(1), in other cases, the virtual agent 106 can communicate with users via a non-computing device, such as a landline-based telephone.

Figure 3B:
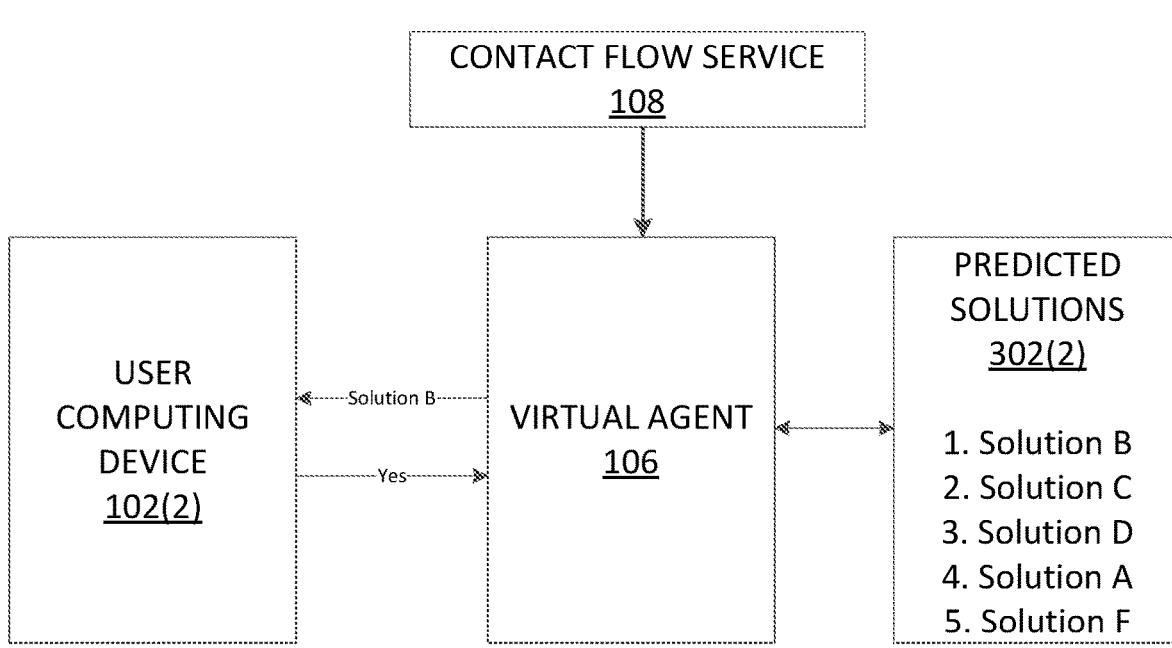
FIG. 3B depicts an example interaction between a virtual agent and a second user at a second time with an updated set of solutions predicted to resolve the second user's issue, which is similar to the first user's issue.

Example Interaction Between a Virtual Agent and User With an Updated Set of Predicted Solutions FIG. 3B depicts an example interaction 350 between a virtual agent 106 and a second user at a second time, subsequent to the first time described above in FIG. 3A. In the example interaction 350, the virtual agent 106 provides the second user, via the second computing device 102(2), predicted solutions from the updated set of predicted solutions 302(2). For example, if the error associated with the second user has the same error code as the first user and the second computing device has the same context as the first computing device when the error occurs, the callback service can retrieve the updated set of predicted solutions 302(2) from the predicted solution database. In some cases, the updated set of predicted solutions 302(2) can include the same predicted solutions as the first time but in a different ranking order.

In other cases, as depicted, the updated set of predicted solutions 302(2) can include different predicted solutions for resolving the same error. For example, new user generated solutions for an error can be added to the set of predicted solutions (e.g., Solution F is added to the updated set of predicted solutions 302(2)). As another example, predicted solutions determined by the callback service to not resolve the problem are removed from the set of predicted solutions (e.g., Solution E is removed from the set of predicted solutions).

In the example interaction, the virtual agent 106 provides Solution B to the second user via the second computing device and receives a response "Yes" from the user, indicating the error is resolved. The set of predicted solutions is updated again to indicate Solution B successfully resolved the error.

Example of Automated Callback Service

Figure 4:
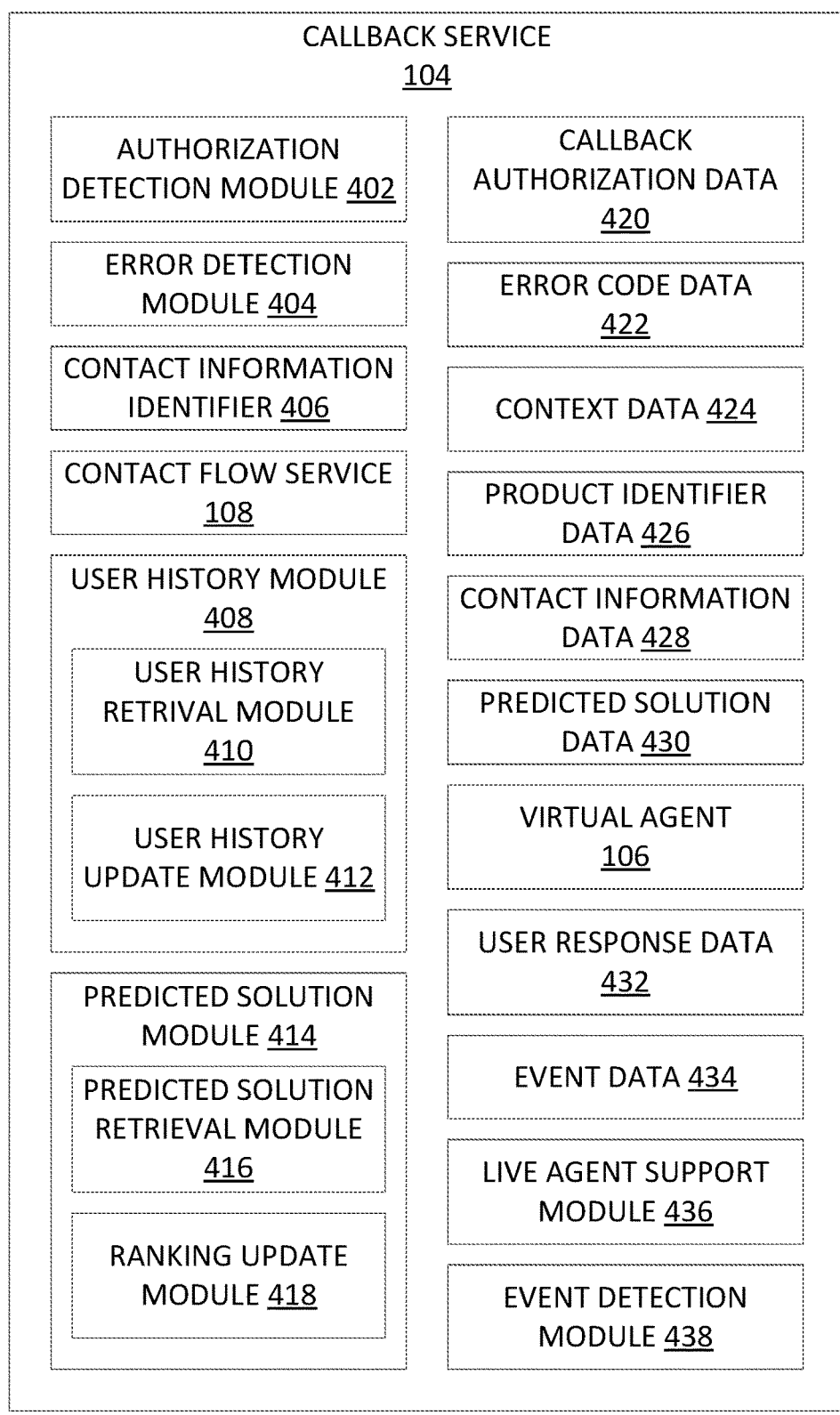
FIG. 4 depicts an example of the automated callback service.

FIG. 4 depicts an example of automated callback service 104 capable of establishing a callback to a user. In some cases, the callback connects the user with a virtual agent to resolve the user's issue with a set of predicted solutions, which are ranked according to likelihood of resolving the user's issue.

As shown, the automated callback service 104 includes an authorization detection module 402, an error detection module 404, a contact information identifier 406, a contact flow service 108, a user history module 408, a predicted solution module 414, callback authorization data 420, error code data 422, context data 424, product identifier data 426, contact information data 428, predicted solution data 430, a virtual agent 106, user response data 432, event data 434, a live agent support module 436, and an event detection module 438.

The authorization detection module 402 determines whether the user authorized contact from the virtual agent via the callback service. For example, when the user is interacting with a software program product (e.g., upon installation or encountering an error), the user can be prompted to accept or decline assistance via an automated callback with a virtual agent in the event of an error or other related issue with the software program product. In some cases, the authorization detection module 402 receives and stores the authorization as callback authorization data 420 so when the user encounters an issue, the callback service 104 can initiate the automated callback.

The error detection module 404 detects errors from a computing device of a user, such as an error message. In some cases, the error detection module 404 receives the error message from a computing device after the computing device invokes a Representational State Transfer (REST) endpoint. For example, the computing device can invoke a REST endpoint upon failure to properly install a software program product. In other another example, the computing device can invoke a REST endpoint upon failure to properly initiate a particular feature of the software program product.

The error message can include error code data 422 indicating the type of error that occurred. The error message can also include context data 424 indicating the context of the computing device (e.g., the type of computing device, a timestamp, and at what point in the operational flow of the installation and/or use of the application the error occurs). The error message can also include product identifier data 426 indicating the product identifier and identifying the particular product the error occurred on. In some cases, each product identifier is a unique identifier (e.g., a product license number).

The contact information identifier 406 retrieves contact information data 428 of the user associated with the computing device that has an error based on the product identifier received by the callback service via the error detection module 404. The contact information data 428 is stored in a contact information database. In some cases, the contact information identifier 406 can query the contact information database with the product identifier data 426 and retrieve corresponding contact information data 428 of a user from the contact information database.

The contact flow service 108, as described in FIGS. 1-3B, establishes a connection to the user to interact with the virtual agent 106 and analyzes the interaction to determine whether to retrieve another predicted solution from the predicted solution data 430.

The user history module 408 comprises a user history retrieval module 410 and a user history update module 412. In some cases, the user history retrieval module 410 retrieves the user history associated with the user. For example, after receiving an error message and identifying the user contact information based on the product identifier, the user history retrieval module 410 can retrieve the user history of the user that includes a record of previous interactions between the user and the product (e.g., a software program product) including installation and history of use (e.g., duration and location of use, features used).

After retrieving the user history, the user history module 408 provides the user history to the predicted solution module 414 in order to determine a set of predicted solutions particular to the user. For example, if indicated in the user history that the user has encountered the same error previously, then the predicted solution module 414 can retrieve a set of predicted solutions ranked according to the user so that a predicted solution that previously resolved the same error for the user is provided first.

In some cases, once a user indicates that a predicted solution resolves the error or that none of the predicted solutions in the set of solutions resolves the error, the user history update module 412 updates the user history record of the user to indicate as such so that in the next instance of an error, the callback service can retrieve the set of predicted solutions for the user according to the user history. In other cases, once a user indicates a predicted solution resolves the error, the ranking of the predicted solution in the set of predicted solutions is updated by the ranking update module 418. For example, if a predicted solution with a third ranking in the set of predicted solutions resolves the error (as indicated by the user), then the ranking of the predicted solution is updated to a first (highest) ranking. As another example, if there is a predicted solution that has been ranked last in the set of predicted solution and is determined that over a period of time that the predicted solution ranked last is not indicated by any user as resolving a particular issue, then the last ranked predicted solution may be removed from the set of predicted solutions for resolving the particular issue. In the place of the removed predicted solution, in some cases, a new predicted solution may be added.

The live agent support module 436 can redirect the user to a live agent. For example, if the user is presented each predicted solution during the interaction with the virtual agent, and the user indicates during the interaction that none of the predicted solutions resolves the issue, then the live agent support module 436 can connect the user to a live agent available to assist the user.

In some embodiments, the callback service 104 can contact a user to remind the user of upcoming events. In some cases, the event detection module 438 can retrieve event data 434 associated with the user from an event database. For example, based on contact information, the event detection module 438 can identify events associated with the user in the event database and determine which events are pending (e.g., bill payment due date, filing deadline, meeting appointment). Based on the determination, the event detection module 438 can send a notification to the contact flow service to connect the user to the virtual agent 106. In such cases, the virtual agent 106 can remind the user of a pending event.

Example of Establishing an Automated Callback

Figure 5:
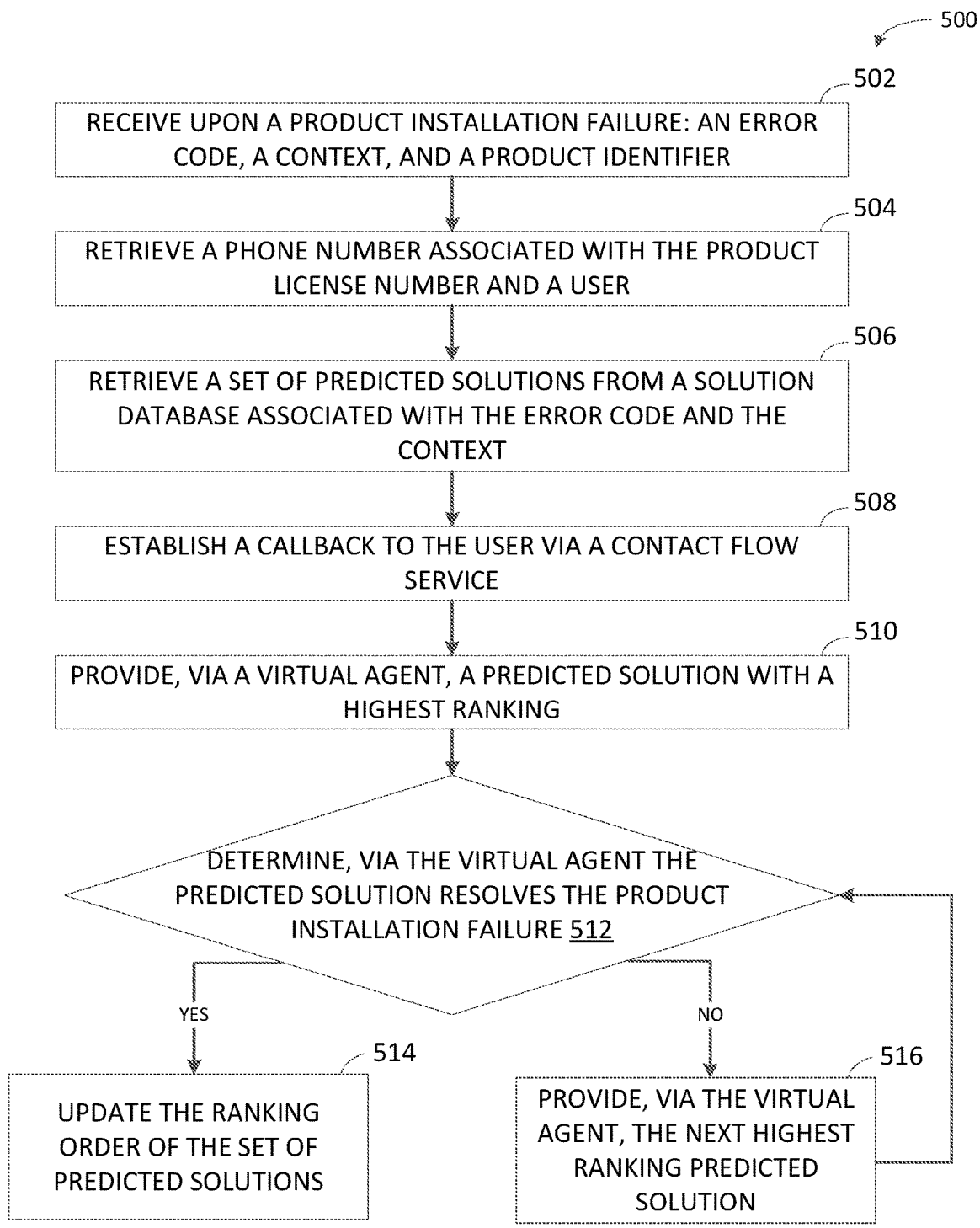
FIG. 5 depicts an example flow diagram of establishing an automated callback to a user with a virtual agent via the callback service.

FIG. 5 depicts an example method 500 of establishing an automated callback, as described with respect to FIGS. 1-4.

At step 502, an error code, a context, and a product identifier are received upon a product installation failure. In some cases, the error code, context, and product identifier are included in an error message received by the callback service. In other cases, the error message (e.g., the error code, context, and product identifier) are received upon a product failure, such as a failure to initiate a feature of a software program product on a user computing device. The receipt of the error message can occur at a first time from a first REST endpoint that is invoked by a first computing device upon a product installation failure or a product feature failure of a product at the first computing device.

At step 504, a phone number associated with the product identifier is retrieved. For example, based on the product identifier, the contact information database may be queried to identify contact information associated with the user.

At step 506, a set of predicted solutions is retrieved from a solution database associated with the error code and the context. In some cases, the error code and context can identify a set of predicted solutions from the solution database that can resolve the particular error. The set of predicted solutions can include knowledge-based articles and previously generated solutions known to resolve issue(s) associated with a particular error code and/or context. In other cases, the user history can also identify a set of predicted solutions, as described in FIGS. 1 and 4.

At step 508, a callback to the user is established via a contact flow service. The contact flow service establishes a connection to a user to interact with a virtual agent based on the contact information.

At step 510, a predicted solution with a highest ranking in the set of predicted solutions is provided to a user via the virtual agent.

After providing the predicted solution with the highest ranking to the user, at step 512, a determination is made via the virtual agent as to whether or not the predicted solution with the highest ranking resolves the issue for the user. In some cases, a response is received from the user indicating the predicted solution with the highest ranking resolves the issue. For example, the virtual agent can determine based on natural language processing tools that the response received from the user indicates successful resolution of the issue. In the case where a response resolves the issue, the virtual agent at step 514, updates the ranking order of the set of predicted solutions to indicate the predicted solution resolved the issue.

In other cases, a response may be received from the user indicating the predicted solution does not resolve the issue. In such cases, at step 516, the next highest ranking predicted solution is provided via the virtual agent to the user. Additionally, in some cases, the ranking order of the set of predicted solutions can be updated via the virtual agent to indicate the previously provided predicted solution fails to resolve the issue. After the next highest ranking predicted solution is provided to the user, the same determination is made via the virtual agent at step 512 as to whether the predicted solution resolves the issue (e.g., a product installation failure). The method continues to provide each predicted solution in the set of predicted solutions according to the ranking, until there is a determination the predicted solution resolves the error (e.g., the virtual agent determines based on user response that a predicted solution resolves the issue) or there are no more predicted solutions for the virtual agent to provide to the user.

For example, a second predicted solution with a second highest ranking can be provided after determining via the virtual agent the first predicted solution with the highest ranking does not resolve the issue. Once the second predicted solution is provided, another determination is made via the virtual agent as to whether the second predicted solution resolves the issue (e.g., via analysis of user response to the virtual agent). If the second predicted solution resolves the issue, the ranking order is updated so that the second predicted solution has the highest ranking so future users facing the same issue as the user may be provided the second predicted solution first. If the second predicted solution does not resolve the issue, the next highest ranking solution is provided to the user until a predicted solution either resolves the issue or there are no more predicted solutions to provide to the user. Additionally, in some cases, with each iteration of providing a predicted solution to the user, the ranking order of the set of predicted solutions is updated via the virtual agent, to indicate whether the predicted solution resolved the issue.

Example of a User Interacting With a Virtual Agent

Figure 6:
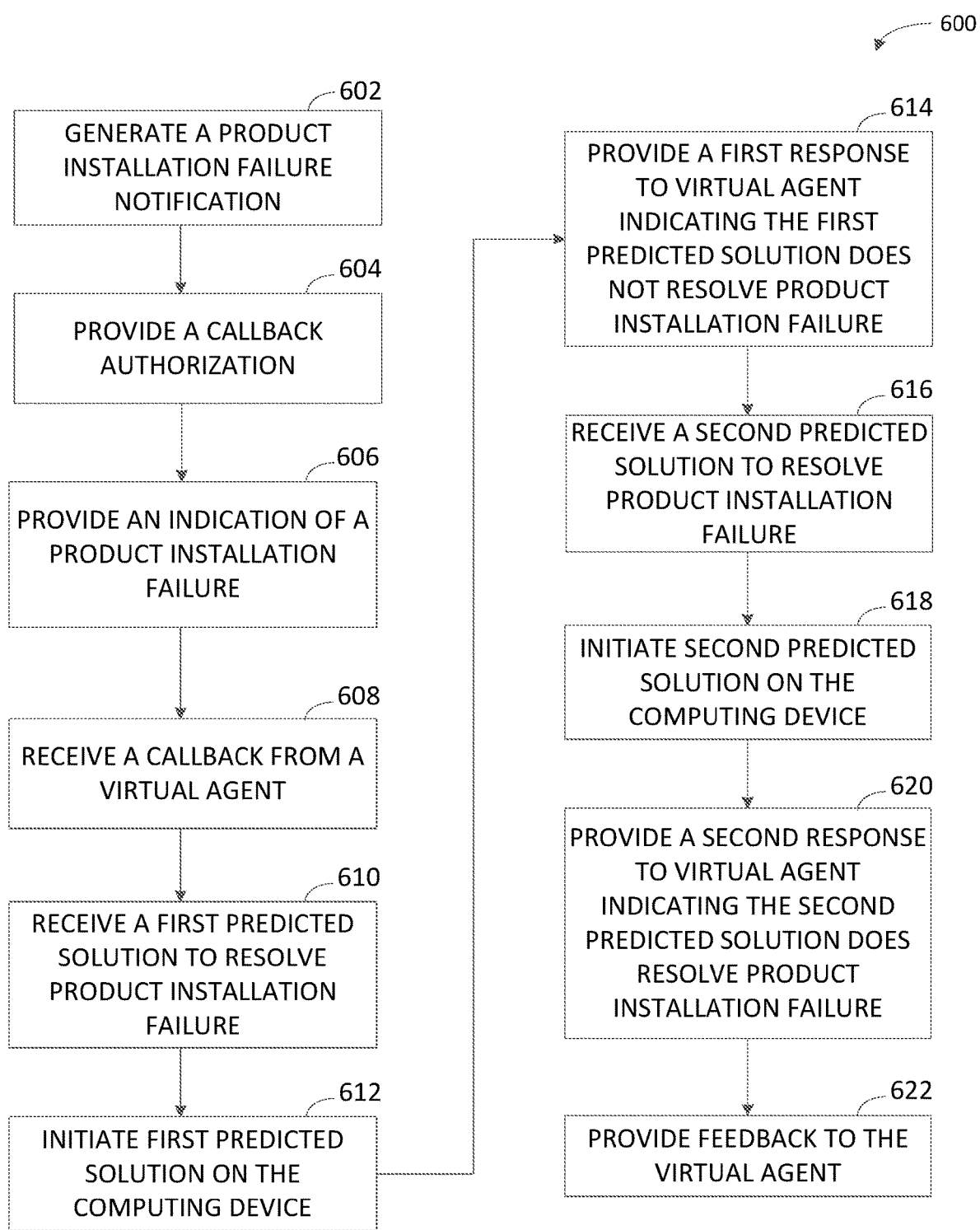
FIG. 6 depicts an example flow diagram of a user interacting with the virtual agent during an automated callback.

FIG. 6 depicts an example method 600 of a user interacting with a virtual agent of the call back service, as described with respect to FIGS. 1-4.

At step 602, a notification of a product failure (e.g., product installation or feature failure) is generated. In some cases, the notification is generated by the computing device and displayed to a user of the computing device, for example, as a message.

At step 604, callback authorization is provided to a callback service. In some cases, the user can authorize a callback from the callback service. For example, the computing device can display a request to the user for callback authorization. In such cases that the user authorizes callback, the user authorization is provided via the computing device to the callback service. In some cases, the callback authorization to receive assistance from a virtual agent is provided prior to any product failures. In other cases, the user can provide callback authorization on a per instance basis via the computing device.

At step 606, an indication of the product failure (e.g., product installation or feature failure) is provided. The indication can include an error code, context, and product license. In some cases, the indication is included as part of an error message. The indication of the product failure is provided by the computing device to the callback service. For example, upon the product failure, the computing device can invoke a REST endpoint.

At step 608, a callback is received from a virtual agent of the callback service. In some cases, the computing device on which there is a product failure has telecommunication capabilities, such as a cellular device, tablet computer, and other electronic devices capable of telecommunication, allowing the user to interact with the virtual agent via the computing device.

At step 610, a first predicted solution from a set of predicted solutions is received from the callback service. The first predicted solution is presented to the user via the communication device from the virtual agent. In some cases, the first predicted solution can be received as audio data and/or text data.

At step 612, the first predicted solution is initiated on the computing device. The first predicted solution has the highest ranking in the set of predicted solutions. In some cases, the first predicted solution is initiated by the user. After the first predicted solution is initiated, the computing device can determine whether the first predicted solution was successful in resolving the error. In some cases, the computing device can display a message to the user indicating the first predicted solution was successful. In such cases, the communication between the user and the virtual agent via the computing device may be disconnected.

In other cases, the computing device can display a message to the user indicating the first predicted solution does not resolve the error. In such cases, the example method continues to step 614, where a first response is provided to the virtual agent indicating the first predicted solution does not resolve the error. In some cases, the first response is based on audio data received by the computing device from the user. In other cases, the first response is generated by the computing device and provided to the virtual agent.

At step 616, after providing an indication the first predicted solution does not resolve the error, a second predicted solution is received by the computing device to resolve the error. At step 618, the second predicted solution is initiated on the computing device.

At step 620, a second response is provided to the virtual agent. In some cases, the second response may indicate that the second predicted solution does not resolve the error. In such cases, the computing device can continue receiving predicted solutions in ranking order from the virtual agent until a response indicates the error is resolved or there are no more predicted solutions.

At step 622, feedback is provided to the virtual agent by the computing device. In some cases, the feedback is based on audio data provided by the user of the computing device. In other cases, the feedback is generated by the computing device and can include metadata associated with the callback (e.g., duration of the callback) and the result of each initiated predicted solution.

Example Processing System for Establishing an Automated Call

Figure 7:
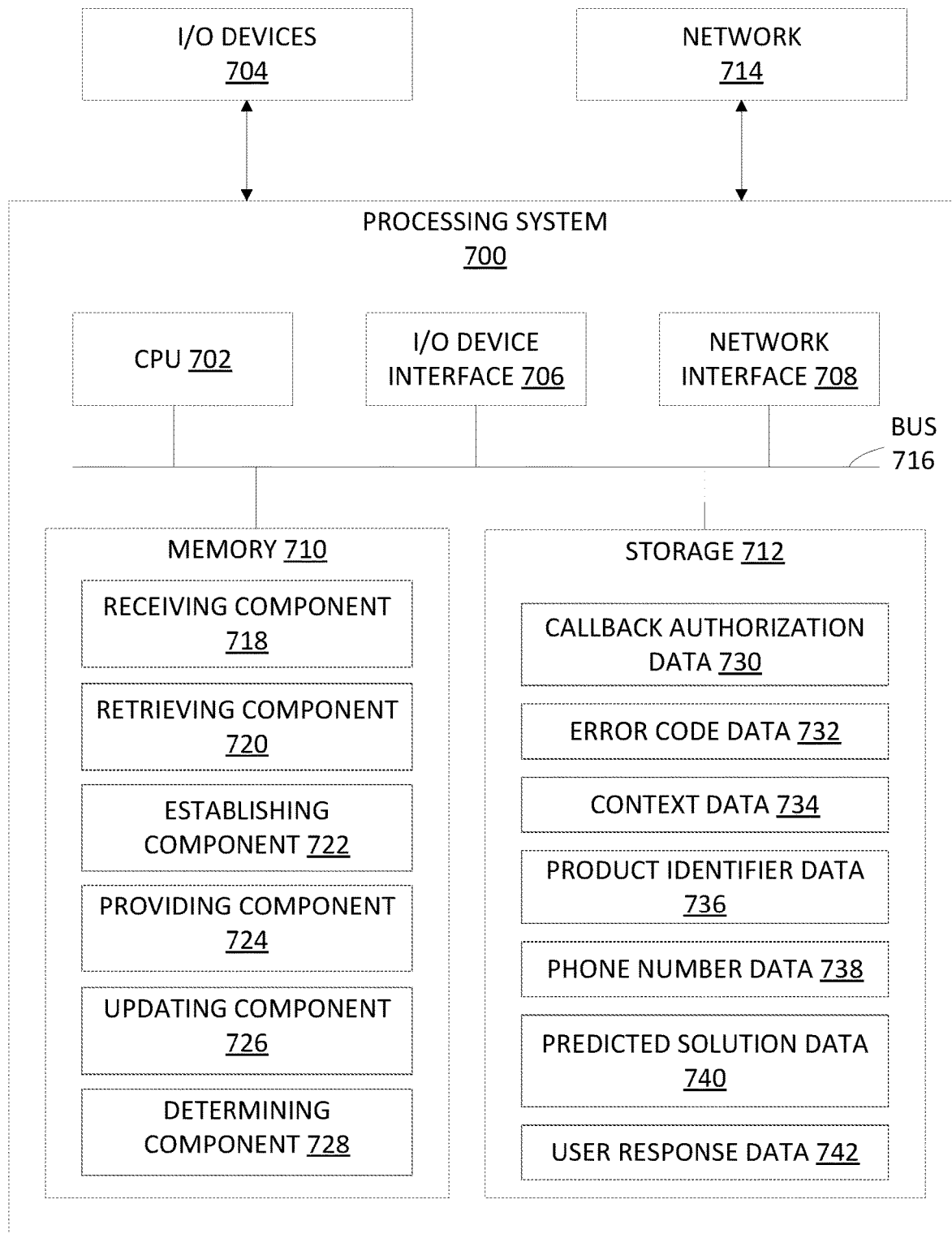
FIG. 7 depicts an example processing system for establishing an automated call via the automated callback service in which the user and virtual agent interact to resolve the user's issue with a set of solutions predicted to resolve the user's issue.

FIG. 7 depicts an example processing system 700 that may perform methods described herein, such as the method for establishing an automated callback to a user described with respect to FIGS. 1-5.

Processing system 700 includes a central processing unit (CPU) 702 connected to a data bus 716. CPU 702 is configured to process computer-executable instructions, e.g., stored in memory 710 or storage 712, and to cause the processing system 700 to perform methods described herein, for example with respect to FIGS. 1-5. CPU 702 is included to be representative of a single CPU, multiple CPUs, a single CPU having multiple processing cores, and other forms of processing architecture capable of executing computer-executable instructions.

Processing system 700 further includes input/output (I/O) device(s) 706 and interface(s) 704, which allows processing system 700 to interface with input/output devices 706, such as, for example, keyboards, displays, mouse devices, pen input, and other devices that allow for interaction with processing system 700. Note that processing system 700 may connect with external I/O devices through physical and wireless connections (e.g., an external display device).

Processing system 700 further includes network interface 708, which provides processing system 700 with access to external networks 714 and thereby external computing devices.

Processing system 700 further includes memory 710, which in this example includes receiving component 718, retrieving component 720, establishing component 722, providing component 724, updating component 726, and determining component 728 for performing operations described in FIGS. 1-5.

Note that while shown as a single memory 710 in FIG. 7 for simplicity, the various aspects stored in memory 710 may be stored in different physical memories, but all accessible by CPU 702 via internal data connections such as bus 716.

Storage 712 further includes callback authorization data 730, which may include the authorization received from the user via the user computing device, as described in FIG. 4.

Storage 712 further includes callback error code data 732, which may be like the error code received from the user computing device, as described in FIGS. 1, 4.

Storage 712 further includes context data 734, which may be like the context of the user computing device (e.g., the type of computing device, a timestamp, and at what point in the operational flow of the installation and/or use of the application the error occurs) as described in FIGS. 1, 4.

Storage 712 further includes product identifier data 736, which may be like the product identifier received from the user computing device, as described in FIGS. 1, 4.

Storage 712 further includes phone number data 738, which may be like the phone number (e.g., a landline telephone number or a cellular device number) retrieved from the contact information database, as described in FIGS. 1, 4.

Storage 712 further includes predicted solution data 740, which may be like the knowledge-based article or user generated solution for an error, as described in FIGS. 1, 4.

Storage 712 further includes user response data 742, which may be like the response from the user indicating whether the predicted solution resolved the error on the user computing device, as described in FIGS. 1-4.

While not depicted in FIG. 7, other aspects may be included in storage 712.

As with memory 710, a single storage 712 is depicted in FIG. 7 for simplicity, but the various aspects stored in storage 712 may be stored in different physical storages, but all accessible to CPU 702 via internal data connections, such as bus 716, or external connection, such as network interface 708. One of skill in the art will appreciate that one or more elements of processing system 700 may be located remotely and accessed via a network.

Example Computing Device for User and Virtual Agent Interaction

Figure 8:
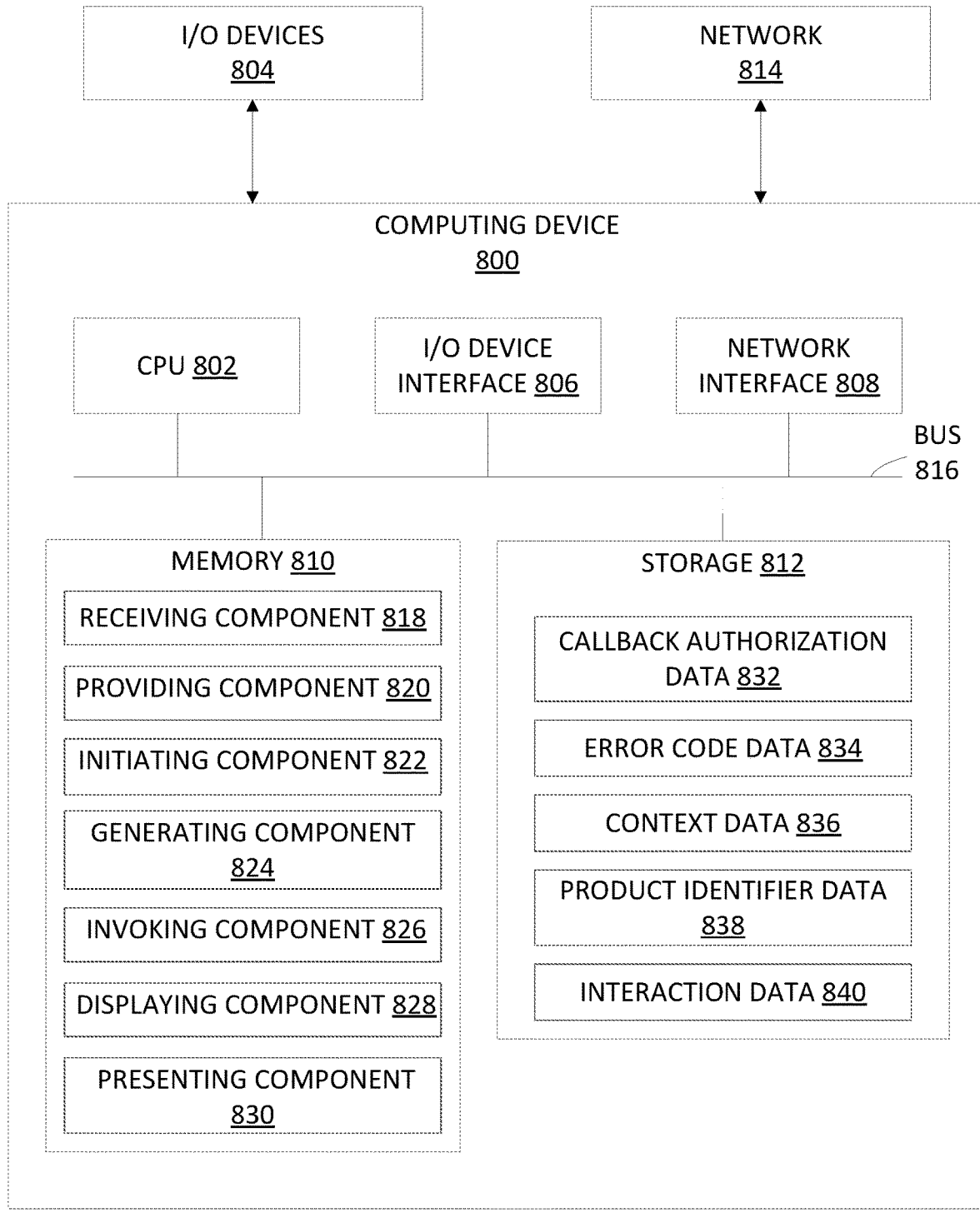
FIG. 8 depicts an example computing device in which the user and virtual agent interact to resolve the user's issue with a set of solutions predicted to resolve the user's issue.

FIG. 8 depicts an example computing device 800 that may perform methods described herein, such as the method for a user interacting with a virtual agent of the automated callback service described with respect to FIG. 6.

Computing device 800 includes a central processing unit (CPU) 802 connected to a data bus 816. CPU 802 is configured to process computer-executable instructions, e.g., stored in memory 810 or storage 812, and to cause the computing device 800 to perform methods described herein, for example with respect to FIG. 6. CPU 802 is included to be representative of a single CPU, multiple CPUs, a single CPU having multiple processing cores, and other forms of processing architecture capable of executing computer-executable instructions.

Computing device 800 further includes input/output (I/O) device(s) 804 and interface(s) 806, which allows computing device 800 to interface with input/output devices 804, such as, for example, keyboards, displays, mouse devices, pen input, and other devices that allow for interaction with computing device 800. Note that computing device 800 may connect with external I/O devices through physical and wireless connections (e.g., an external display device).

Computing device 800 further includes network interface 808, which provides computing device 800 with access to external networks 814 and thereby external computing devices.

Computing device 800 further includes memory 810, which in this example includes receiving component 818, providing component 820, initiating component 822, generating component 824, invoking component 826, displaying component 828, and presenting component 830 for performing operations described in FIG. 6.

Note that while shown as a single memory 810 in FIG. 8 for simplicity, the various aspects stored in memory 810 may be stored in different physical memories, but all accessible by CPU 802 via internal data connections such as bus 816.

Storage 812 further includes callback authorization data 832, which may include the authorization received from the user, as described in FIG. 4.

Storage 812 further includes callback error code data 834, which may be like the error code generated by the computing device upon for example, an product installation failure, as described in FIGS. 1, 4.

Storage 812 further includes context data 836, which may be like the context of the user computing device (e.g., the type of computing device, a timestamp, and at what point in the operational flow of the installation and/or use of the application the error occurs) as described in FIGS. 1, 4.

Storage 812 further includes product identifier data 838, which may be like the product identifier of the computing device, as described in FIGS. 1, 4.

Storage 812 further includes interaction data 840, which may be data received from the virtual agent (e.g., a predicted solution), data received from the user (e.g., user response to the predicted solution received from the virtual agent), and other similar data encompassing the interaction between the user and the virtual agent, as described in FIGS. 1, 4. In some cases, the interaction data can be audio data and/or text data.

While not depicted in FIG. 8, other aspects may be included in storage 812.

As with memory 810, a single storage 812 is depicted in FIG. 8 for simplicity, but the various aspects stored in storage 812 may be stored in different physical and/or virtual storage types, but all accessible to CPU 802 via internal data connections, such as bus 816, or external connection, such as network interface 808. One of skill in the art will appreciate that one or more elements of computing device 800 may be located remotely and accessed via a network.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, at a first time from a first Representational State Transfer (REST) endpoint invoked by a first computing device upon a product installation failure of a product at the first computing device:
      an error code indicative of a type of product installation failure;
      a context of the first computing device; and
      a product identifier associated with the product at the first computing device;
   retrieving a phone number associated with:
      the product identifier; and
      a user of the first computing device;
   retrieving a set of predicted solutions from a solution database associated with the error code and the context of the first computing device, wherein each predicted solution is associated with a ranking in a ranking order of the set of predicted solutions;
   establishing, based on the retrieved phone number, a callback to the user via a contact flow service;
   providing, to the user via a virtual agent, a predicted solution with a highest ranking in the ranking order of the set of predicted solutions;
   determining, via the virtual agent, the predicted solution with the highest ranking in the ranking order resolves the product installation failure on the first computing device; and
   updating the ranking order of the set of predicted solutions based on the predicted solution with the highest ranking resolving the product installation failure.

2. The method of claim 1, further comprising:
   determining, via the virtual agent, the predicted solution with the highest ranking in the ranking order does not resolve the product installation failure on the first computing device;
   providing, to the user via the virtual agent, a second predicted solution with the second highest ranking in the ranking order;
   determining, via the virtual agent, the second predicted solution resolves the product installation failure on the first computing device;
   updating the second predicted solution in the set of predicted solutions associated with the error code to the highest ranking predicted solution in the ranking order; and
   updating the predicted solution with the highest ranking in the set of predicted solutions to the second highest ranking in the ranking order.

3. The method of claim 2, further comprising:
   receiving, at a second time subsequent to the first time from a second REST endpoint invoked upon a product installation failure of the product at a second computing device:
      the error code;
      a context of the second computing device; and
      a product identifier associated with the product at the second computing device;
   providing to a second user associated with the second computing device, via the virtual agent, the second predicted solution in the set of predicted solutions with the highest ranking; and
   receiving from the second user via the virtual agent a first response indicating the second predicted solution with the highest ranking resolves the product installation failure on the second computing device.

4. The method of claim 1, further comprising:
providing, to the user via the virtual agent, each predicted solution in the set of predicted solutions in the ranking order;
receiving, from the user via the virtual agent, for each predicted solution in the set of predicted solutions, a response that each predicted solution fails to resolve the product installation failure on the first computing device; and
connecting the user to a live support agent.

5. The method of claim 1, further comprising: receiving an indication from the user associated with the product and the first computing device to initiate the callback.

6. The method of claim 1, wherein the retrieving the set of predicted solutions comprises:
identifying a user history of product installations indicating each success or failure associated with previous product installations;
determining a pattern in the previous product installations; and
retrieving the set of predicted solutions based on the pattern in the previous product installations.

7. The method of claim 1, further comprising:
receiving, via the virtual agent, feedback from the user about the callback; and
disconnecting the callback after receiving the feedback.

8. A non-transitory computer-readable storage medium storing instructions for a method, the method comprising:
receiving, at a first time from a first REST endpoint invoked by a first computing device upon a product installation failure of a product at the first computing device:
an error code indicative of a type of product installation failure;
a context of the first computing device; and
a product identifier associated with the product at the first computing device;
retrieving a phone number associated with:
the product identifier; and
a user of the first computing device;
retrieving a set of predicted solutions from a solution database associated with the error code and the context of the first computing device, wherein each predicted solution is associated with a ranking in a ranking order of the set of predicted solutions;
establishing, based on the retrieved phone number, a callback to the user via a contact flow service;
providing, to the user via a virtual agent, a predicted solution with a highest ranking in the ranking order of the set of predicted solutions;
determining, via the virtual agent, the predicted solution with the highest ranking in the ranking order resolves the product installation failure on the first computing device; and
updating the ranking order of the set of predicted solutions based on the predicted solution with the highest ranking resolving the product installation failure.

9. The non-transitory computer-readable storage medium of claim 8, further comprising:
determining, via the virtual agent, the predicted solution with the highest ranking in the ranking order does not resolve the product installation failure on the first computing device;
providing, to the user via the virtual agent, a second predicted solution with the second highest ranking in the ranking order;
determining, via the virtual agent, the second predicted solution resolves the product installation failure on the first computing device;
updating the second predicted solution in the set of predicted solutions associated with the error code to the highest ranking predicted solution in the ranking order; and
updating the predicted solution with the highest ranking in the set of predicted solutions to the second highest ranking in the ranking order.

10. The non-transitory computer-readable storage medium of claim 9, further comprising:
receiving, at a second time subsequent to the first time from a second REST endpoint invoked upon a product installation failure of the product at a second computing device:
the error code;
a context of the second computing device; and
a product identifier associated with the product at the second computing device;
providing to a second user associated with the second computing device, via the virtual agent, the second predicted solution in the set of predicted solutions with the highest ranking; and
receiving from the second user via the virtual agent a first response indicating the second predicted solution with the highest ranking resolves the product installation failure on the second computing device.

11. The non-transitory computer-readable storage medium of claim 8, further comprising:
providing, to the user via the virtual agent, each predicted solution in the set of predicted solutions in the ranking order;
receiving, from the user via the virtual agent, for each predicted solution in the set of predicted solutions, a response that each predicted solution fails to resolve the product installation failure on the first computing device; and
connecting the user to a live support agent.

12. The non-transitory computer-readable storage medium of claim 8, further comprising: receiving an indication from the user associated with the product and the first computing device to initiate the callback.

13. The non-transitory computer-readable storage medium of claim 8, wherein the retrieving the set of predicted solutions comprises:
identifying a user history of product installations indicating each success or failure associated with previous product installations;
determining a pattern in the previous product installations; and
retrieving the set of predicted solutions based on the pattern in the previous product installations.

14. The non-transitory computer-readable storage medium of claim 8, further comprising:
receiving, via the virtual agent, feedback from the user about the callback; and
disconnecting the callback after receiving the feedback.

15. A system, comprising:
a processor; and
a memory storing instruction which when executed by the processor perform a method, comprising:

receiving, at a first time from a first REST endpoint invoked by a first computing device upon a product installation failure of a product at the first computing device:
- an error code indicative of a type of product installation failure;
- a context of the first computing device; and
- a product identifier associated with the product at the first computing device;

retrieving a phone number associated with:
- the product identifier; and
- a user of the first computing device;

retrieving a set of predicted solutions from a solution database associated with the error code and the context of the first computing device, wherein each predicted solution is associated with a ranking in a ranking order of the set of predicted solutions;

establishing, based on the retrieved phone number, a callback to the user via a contact flow service;

providing, to the user via a virtual agent, a predicted solution with a highest ranking in the ranking order of the set of predicted solutions; and determining, via the virtual agent, the predicted solution with the highest ranking in the ranking order resolves the product installation failure on the first computing device; and updating the ranking order of the set of predicted solutions based on the predicted solution with the highest ranking resolving the product installation failure.

16. The system of claim 15, further comprising:
determining, via the virtual agent, the predicted solution with the highest ranking in the ranking order does not resolve the product installation failure on the first computing device;
providing, to the user via the virtual agent, a second predicted solution with the second highest ranking in the ranking order;
determining, via the virtual agent, the second predicted solution resolves the product installation failure on the first computing device;
updating the second predicted solution in the set of predicted solutions associated with the error code to the highest ranking predicted solution in the ranking order; and updating the predicted solution with the highest ranking in the set of predicted solutions based on the error code to the second highest ranking in the ranking order.

17. The system of claim 16, further comprising:
receiving, at a second time subsequent to the first time from a second REST endpoint invoked upon a product installation failure of the product at a second computing device:
- the error code;
- a context of the second computing device; and
- a product identifier associated with the product at the second computing device;

providing to a second user associated with the second computing device, via the virtual agent, the second predicted solution in the set of predicted solutions with the highest ranking; and receiving from the second user via the virtual agent a first response indicating the second predicted solution with the highest ranking resolves the product installation failure on the second computing device.

18. The system of claim 15, further comprising:
providing, to the user via the virtual agent, each predicted solution in the set of predicted solutions in the ranking order;
receiving, from the user via the virtual agent, for each predicted solution in the set of predicted solutions, a response that each predicted solution fails to resolve the product installation failure on the first computing device; and
connecting the user to a live support agent.

19. The system of claim 15, wherein the retrieving the set of predicted solutions comprises:
identifying a user history of product installations indicating each success or failure associated with previous product installations;
determining a pattern in the previous product installations; and
retrieving the set of predicted solutions based on the pattern in the previous product installations.

20. The system of claim 15, further comprises:
receiving, via the virtual agent, feedback from the user about the callback; and
disconnecting the callback after receiving the feedback.

* * * * *